United States Patent
Jang et al.

(10) Patent No.: US 11,167,539 B2
(45) Date of Patent: Nov. 9, 2021

(54) INKJET PRINT APPARATUS, INKJET PRINTING METHOD USING THE SAME, AND LAMINATION METHOD USING THE SAME

(71) Applicant: SAMSUNG DISPLAY CO., LTD., Yongin-Si (KR)

(72) Inventors: Euiyun Jang, Seoul (KR); Cheolgeun An, Yongin-si (KR); Wonjoon Choi, Yongin-si (KR); Jeongho Hwang, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 346 days.

(21) Appl. No.: 16/254,356

(22) Filed: Jan. 22, 2019

(65) Prior Publication Data

US 2019/0224954 A1  Jul. 25, 2019

(30) Foreign Application Priority Data

Jan. 23, 2018 (KR) .................. 10-2018-0008212

(51) Int. Cl.
*B32B 37/12* (2006.01)
*B32B 38/00* (2006.01)
(Continued)

(52) U.S. Cl.
CPC .............. *B32B 37/12* (2013.01); *B05C 5/027* (2013.01); *B05C 5/0295* (2013.01);
(Continued)

(58) Field of Classification Search
CPC ... B32B 37/12; B32B 37/1284; B32B 38/145; B32B 2037/1253; B32B 2310/0831;
(Continued)

(56) References Cited

U.S. PATENT DOCUMENTS 6,783,227 B2 * 8/2004 Suzuki ............... B41J 11/00218
347/102
7,393,095 B2 * 7/2008 Oshima .................. B41J 11/002
347/101
(Continued)

FOREIGN PATENT DOCUMENTS

CN      102241188 A    11/2011
CN      103796767 A     5/2014
(Continued)

OTHER PUBLICATIONS

China Office Action for corresponding China Patent Application No. 201910057131.6, China Office Action dated Sep. 18, 2021 (6 pgs.).

*Primary Examiner* — Michael N Orlando
*Assistant Examiner* — Abhishek A Patwardhan
(74) *Attorney, Agent, or Firm* — Lewis Roca Rothgerber Christie LLP

(57) ABSTRACT

An inkjet print apparatus includes a stage; an inkjet head located over an upper portion of the stage, configured to move in a first direction and a second direction opposite to the first direction, and configured to eject an ink toward the stage; a first ultraviolet irradiator located behind the inkjet head with respect to the first direction first covers located at respective sides of the first ultraviolet irradiator in the first direction; a second ultraviolet irradiator located behind the inkjet head with respect to the second direction; and second covers located at respective sides of the second ultraviolet irradiator in the second direction. Further, a process for forming an adhesive layer may be simplified by using an inkjet printing method.

9 Claims, 10 Drawing Sheets

(51) Int. Cl.
  *C09D 11/101* (2014.01)
  *B05C 5/02* (2006.01)
(52) U.S. Cl.
  CPC ........ *B32B 37/1284* (2013.01); *B32B 38/145* (2013.01); *C09D 11/101* (2013.01); *B32B 2037/1253* (2013.01); *B32B 2310/0831* (2013.01); *B32B 2457/20* (2013.01)
(58) Field of Classification Search
  CPC ..... B32B 2457/20; B32B 37/10; B32B 38/00; B32B 2038/0076; B32B 2315/08; C09D 11/101; B05C 5/0295; B05C 5/027; B05B 13/041; B05D 3/067; B05D 5/10
  USPC ....................................................... 156/277
  See application file for complete search history.

(56) References Cited

U.S. PATENT DOCUMENTS

| | | | |
|---|---|---|---|
| 7,922,289 B2 | 4/2011 | Lee et al. | |
| 8,602,548 B2 * | 12/2013 | Miyabayashi | B41J 2/01 347/102 |
| 8,967,075 B2 | 3/2015 | Miyamoto et al. | |
| 9,132,685 B2 | 9/2015 | Furuhata et al. | |
| 9,889,681 B2 | 2/2018 | Miyabayashi | |
| 2003/0184631 A1 | 10/2003 | Suzuki et al. | |
| 2004/0092197 A1 | 5/2004 | Wei et al. | |
| 2006/0007290 A1 * | 1/2006 | Oshima | B41J 11/002 347/102 |
| 2011/0018920 A1 * | 1/2011 | Fujisawa | B41J 2/2114 347/9 |
| 2016/0185130 A1 * | 6/2016 | Sugai | B41J 2/2114 347/16 |
| 2017/0348955 A1 | 12/2017 | Back et al. | |

FOREIGN PATENT DOCUMENTS

| | | |
|---|---|---|
| JP | 2004-042525 A | 2/2004 |
| KR | 10-2009-0054764 A | 6/2009 |
| KR | 10-1264979 B1 | 5/2013 |
| KR | 10-1407582 B1 | 6/2014 |
| KR | 10-1735963 B1 | 5/2017 |

* cited by examiner

INKJET PRINT APPARATUS, INKJET PRINTING METHOD USING THE SAME, AND LAMINATION METHOD USING THE SAME

CROSS-REFERENCE TO RELATED APPLICATION

This application claims priority to and the benefit of Korean Patent Application No. 10-2018-0008212, filed on Jan. 23, 2018 in the Korean Intellectual Property Office, the entire content of which is hereby incorporated by reference.

BACKGROUND

1. Field

Aspects of embodiments of the present disclosure relate to an inkjet print apparatus, an inkjet printing method using the same, and a lamination method using the same.

2. Description of the Related Art

An electronic device, such as a mobile communication terminal, a digital camera, a notebook computer, a monitor, or a TV, includes a display device for displaying an image.

The display device includes a display panel configured to generate and display an image, and a window panel disposed on the display panel and configured to protect the display panel. The window panel is attached on the upper portion of the display panel. The image generated from the display panel may pass through the window panel and be provided to an observer.

In addition, the window panel and the display panel may be manufactured in a laminated state such that an overall thickness of the display device may be minimized and an assembly process thereof is facilitated. In adhesion between the display panel and the window panel, various coating methods, such as bar coating and slit coating, may be used for achieving thin and uniform adhesion. In this case, by thinly applying an adhesive at a uniform thickness, the overall thickness of the display device may be minimized or reduced.

SUMMARY

According to aspects of the present disclosure, an inkjet print apparatus, an inkjet printing method using the same, and a lamination method using the same are provided.

According to one or more embodiments of the inventive concept, an inkjet print apparatus includes: a stage; an inkjet head located over an upper portion of the stage, configured to move in a first direction and a second direction opposite to the first direction, and configured to eject an ink toward the stage; a first ultraviolet irradiator located behind the inkjet head with respect to the first direction; first covers located at respective sides of the first ultraviolet irradiator in the first direction; a second ultraviolet irradiator located behind the inkjet head with respect to the second direction; and second covers located at respective sides of the second ultraviolet irradiator in the second direction, wherein the first covers include first upper end portions configured to cover both sides of the first ultraviolet irradiator; and first lower end portions extending from lower ends of the first upper end portions, and tilted in the second direction, and wherein the second covers include second upper end portions configured to cover both sides of the second ultraviolet irradiator; and second lower end portions extending from lower ends of the second upper end portions, and tilted in the first direction.

In an embodiment, the inkjet print apparatus may further include a third ultraviolet irradiator spaced apart by a distance from a side surface of the stage with respect to the first direction.

In an embodiment, irradiation directions of ultraviolet rays provided from the first ultraviolet irradiator and the second ultraviolet irradiator may have angles with respect to an ejection direction of the ink.

In an embodiment, the first ultraviolet irradiator located behind the inkjet head with respect to the first direction may be configured to irradiate ultraviolet rays after the ink is ejected from the inkjet head.

In an embodiment, the third ultraviolet irradiator may have an angle with respect to a line parallel to the first direction.

In an embodiment, the inkjet head may include a plurality of nozzles arranged in at least one row along a direction crossing the first direction and an ejection direction of the ink.

In an embodiment, the first ultraviolet irradiator and the second ultraviolet irradiator may include a plurality of light sources spaced apart from each other in a direction crossing the first direction and the ejection direction of the ink.

In an embodiment, the inkjet head may be configured to move repeatedly from the side surface of the stage adjacent to the third ultraviolet irradiator by a distance.

In an embodiment, the first direction and the second direction may be perpendicular to an ejection direction of the ink.

According to one or more embodiments of the inventive concept: an inkjet printing method includes: mounting a substrate on a stage; and forming an ink layer on the substrate by using an inkjet print apparatus, wherein the forming the ink layer includes: ejecting ink on the substrate from an inkjet head of the inkjet print apparatus; moving the inkjet head in a direction perpendicular to an ejection direction of the ink; and irradiating ultraviolet rays from an ultraviolet irradiator located behind the inkjet head with respect to a moving direction of the inkjet print apparatus to cure the ejected ink; wherein the forming the ink layer is repeated n times, and a light amount of ultraviolet rays irradiated in forming a (n−1)-th ink layer is greater than a light amount of ultraviolet rays irradiated in forming a n-th ink layer, where n is an integer of 1 or more.

In an embodiment, in the forming the (n−1)-th ink layer, the inkjet head may be moved in a first direction, and in the forming the n-th ink layer, the inkjet head may be moved in a direction opposite to the first direction.

In an embodiment, the ink may include an optical clear resin or an optical clear adhesive.

In an embodiment, the viscosity of the ink may be 8 cP to 20 cP.

In an embodiment, an irradiation direction of the ultraviolet rays irradiated from the ultraviolet irradiator may have an angle with respect to the ejection direction of the ink.

In an embodiment, the inkjet head may be moved repeatedly from an edge of the substrate by a distance.

In an embodiment, ultraviolet rays may be irradiated from an auxiliary ultraviolet irradiator spaced apart by a distance (e.g., a predetermined distance) from a side surface of the substrate.

According to one or more embodiments of the inventive concept, a lamination method includes: forming an adhesive layer on a display panel by using an inkjet print apparatus;

and laminating the display panel and a window, wherein the forming the adhesive layer on the display panel includes: mounting the display panel on a stage; ejecting an adhesive from an inkjet head located over an upper portion of the stage to the display panel; moving the inkjet head in a direction perpendicular to an ejection direction of the adhesive; and irradiating ultraviolet rays from an ultraviolet irradiator located behind the inkjet head with respect to a moving direction of the inkjet head, and curing the ejected adhesive, wherein the forming the adhesive layer is repeated m times, and a light amount of ultraviolet rays irradiated in forming a (m−1)-th adhesive layer is greater than a light amount of ultraviolet rays irradiated in forming a m-th adhesive layer, where m is an integer of 1 or more.

In an embodiment, the lamination method may further include re-curing the adhesive layer by irradiating ultraviolet rays after the laminating the display panel and the window.

In an embodiment, the adhesive may include an optical clear resin or an optical clear adhesive.

In an embodiment, the viscosity of the adhesive may be 8 cP to 20 cP.

BRIEF DESCRIPTION OF THE FIGURES

The accompanying drawings are included to provide a further understanding of the inventive concept, and are incorporated in and constitute a part of this specification. The drawings illustrate some exemplary embodiments of the inventive concept and, together with the description, serve to explain principles of the inventive concept. In the drawings.

DETAILED DESCRIPTION

Figure 1:
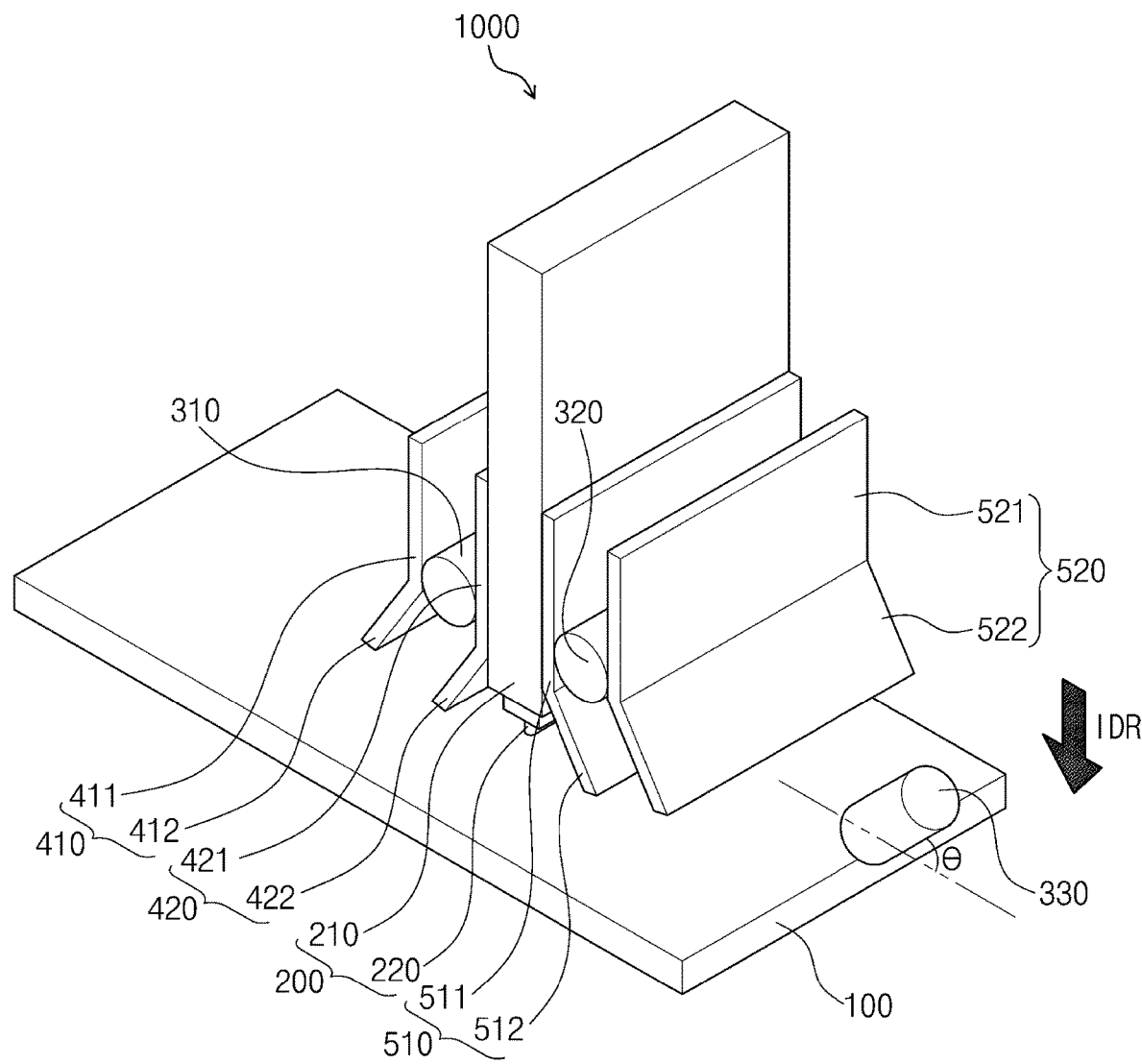
FIG. 1 is a perspective view schematically illustrating an inkjet print apparatus according to an embodiment of the inventive concept.
Figure 1:
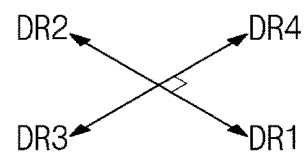

While the present invention is susceptible of various modifications and various forms, some example embodiments are illustrated in the drawings and described in further detail herein. It should be understood, however, that the invention is not intended to be limited to the particular forms disclosed, but, on the contrary, is intended to cover all modifications, equivalents, and alternatives falling within the spirit and scope of the invention.

Like reference numerals are used for like elements in describing each drawing. In the accompanying drawings, the dimensions of structures and layers may be exaggerated for clarity of illustration. Although the terms "first," "second," etc. may be used herein to describe various elements, these elements should not be limited by these terms. These terms are used to distinguish one element from another element. For example, without departing from the teachings of the present invention, a "first" element could be termed a "second" element, and, similarly, a "second" element could also be termed a "first" element. The singular forms are intended to include the plural forms as well, unless the context clearly indicates otherwise.

It is to be understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof. Also, when a portion of a layer, film, region, plate, etc. is referred to as being "on" another portion, it can be directly on, or one or more portions intervening the other portion may also be present. Also, when a portion of a layer, film, region, plate, etc. is referred to as being "under" another portion, it can be directly under, or one or more portions intervening the other portion may also be present. Also, when a portion is referred to as being "on" another portion, it includes the case in which it is at the lower portion as well as the upper portion.

Herein, an inkjet print apparatus 1000 according to an embodiment of the inventive concept will be described with reference to the drawings.

FIG. 1 is a perspective view schematically illustrating the inkjet print apparatus 1000 according to an embodiment of the inventive concept. The inkjet print apparatus 1000 according to an embodiment may include a stage 100, an inkjet head 200, a first ultraviolet irradiator 310, a second ultraviolet irradiator 320, first covers 410 and 420, and second covers 510 and 520. Further, referring to FIG. 1, the inkjet print apparatus 1000 according to an embodiment may further include a third ultraviolet irradiator 330.

The stage 100 may be provided in a plate shape. The shape and size of the stage 100 as viewed in a plane are not limited. However, the stage 100 is illustrated to be, for example, rectangular, as viewed in a plane. The stage 100 provides a space on which a substrate may be mounted.

The inkjet head 200 may be disposed above the stage 100. The inkjet head 200 may be disposed or spaced apart by a distance (e.g., a predetermined distance) from the upper surface of the stage 100 such that an inkjet ejecting process, in which the ink is ejected from the inkjet head 200 onto a substrate mounted on the stage 100, may be carried out. The inkjet head 200 may include a body part 210 and a nozzle 220 exposed below the body part 210. In an embodiment, the inkjet head 200 may include a plurality of nozzles 220, and the nozzles 220 may be arranged in the form of at least one row along an axis extending in third and fourth directions DR3 and DR4 crossing a first direction DR1 and an ink ejection direction IDR.

In an embodiment, the nozzles 220 of the inkjet head 200 may be independently controlled by a control unit (not illustrated). By controlling ink ejection of each of the nozzles 220 through the control unit (not illustrated), the ink may be easily applied on the substrate in a desired shape. Also, an ink storage (not illustrated) configured to store the ink to be ejected on the substrate may be installed or located inside the inkjet head 200. The inkjet head 200 may move in a first direction DR1 and a second direction DR2 opposite to the first direction DR1.

The first ultraviolet irradiator 310 may be disposed behind the inkjet head 200 with respect to the first direction DR1.

In an embodiment, the first ultraviolet irradiator 310 may include a plurality of light sources spaced apart from each other in the third and fourth directions DR3 and DR4 crossing the first direction DR1 and the ink ejection direction IDR, but embodiments of the inventive concept are not limited thereto.

Also, the first ultraviolet irradiator 310 may be integrally formed with the inkjet head 200. Thus, the first ultraviolet irradiator 310 may move in a same direction as the direction in which the inkjet head 200 moves.

When the inkjet head 200 moves in the first direction DR1, the first ultraviolet irradiator 310 may cure ink by irradiating ultraviolet rays. In an embodiment, the ink is ejected on the substrate through the nozzle 220 while the inkjet head 200 moves in the first direction DR1. The ejected ink may be cured by the ultraviolet rays irradiated from the first ultraviolet irradiator 310 concurrently (e.g., simultaneously) with the ejected ink being applied on the substrate.

The first covers 410 and 420 may be disposed on respective sides of the first ultraviolet irradiator 310 in the first direction DR1. The first covers 410 and 420 may include upper end portions 411 and 421 configured to cover both sides of the first ultraviolet irradiator 310. In an embodiment, the upper end portions 411 and 421 of the first covers 410 and 420 may completely cover both sides of the first ultraviolet irradiator 310 in the first direction DR1. The shapes of the upper end portions 411 and 421 as viewed in a plane are not particularly limited as long as the upper end portions 411 and 421 have shapes configured to completely cover both sides of the first ultraviolet irradiator 310 in the first direction DR1. However, the upper end portions 411 and 421 are illustrated to be, for example, rectangular, as viewed in a plane.

The first covers 410 and 420 may include lower end portions 412 and 422 extending from lower ends of the upper end portions 411 and 421 and tilted in the second direction DR2. The lower end portions 412 and 422 of the first covers 410 and 420 may be formed such that the irradiation direction of the ultraviolet rays provided from the first ultraviolet irradiator 310 has an angle (e.g., a predetermined angle) with respect to the ink ejection direction IDR. As a result, the ultraviolet rays do not reach the ejected ink which is not applied on the substrate, so that curing thereof may not be performed. On the other hand, if the irradiation direction of the ultraviolet rays does not have an angle (e.g., a predetermined angle) with respect to the ink ejection direction IDR, the ultraviolet rays may reach the ejected ink which is not applied on the substrate, and there is a limitation that curing may be performed before the ejected ink is applied on the substrate.

In an embodiment, for example, the lower end portions 412 and 422 of the first covers 410 and 420 are tilted in the second direction DR2 with respect to the extending surfaces of the upper end portions 411 and 421 of the first covers 410 and 420, and the lower end portions 412 and 422 of the first covers 410 and 420 may have variable tilt angles with respect to the extending surfaces of the upper end portions 411 and 421 of the first covers 410 and 420. In the present specification, the extending surfaces of the upper end portions 411 and 421 of the first covers 410 and 420 mean virtual surfaces extending in the ink ejection direction IDR. The tilt angles of the lower end portions 412 and 422 of the first covers 410 and 420 may vary depending on the viscosity of the ink to be ejected, the light amount of the ultraviolet rays to be provided from the first ultraviolet irradiator 310, or the like.

In an embodiment, the tilt angles of the lower end portions 412 and 422 of the first covers 410 and 420 with respect to the extending surface of the upper end portions 411 and 421 of the first covers 410 and 420 may be 5 degrees to 80 degrees, and, in an embodiment, 10 degrees to 60 degrees, and, in an embodiment, 15 degrees to 45 degrees.

The second ultraviolet irradiator 320 may be disposed behind the inkjet head 200 with respect to the second direction DR2. The second ultraviolet irradiator 320 may include, but is not limited to, a plurality of light sources spaced apart from each other in the directions DR3 and DR4 crossing the first direction DR1 and the ink ejection direction IDR. Also, the second ultraviolet irradiator 320 may be integrally formed with the inkjet head 200. Thus, the second ultraviolet irradiator 320 may move in the same direction as the direction in which the inkjet head 200 moves.

When the inkjet head 200 moves in the second direction DR2, the second ultraviolet irradiator 320 may cure ink by irradiating ultraviolet rays. In an embodiment, the ink is ejected on the substrate through the nozzle 220 while the inkjet head 200 moves in the second direction DR2. The ejected ink may be cured by the ultraviolet rays irradiated from the second ultraviolet irradiator 320 concurrently (e.g., simultaneously) with the ejected ink being applied on the substrate.

The second covers 510 and 520 may be disposed on respective sides of the second ultraviolet irradiator 310 in the second direction DR2. The second covers 510 and 520 may include upper end portions 511 and 521 covering both sides of the second ultraviolet irradiator 320. In an embodiment, the upper end portions 511 and 521 of the second covers 510 and 520 may completely cover both sides of the second ultraviolet irradiator 320 in the second direction DR2. The shapes of the upper end portions 511 and 521 as viewed in a plane are not particularly limited as long as the upper end portions 511 and 521 have shapes configured to completely cover both sides of the second ultraviolet irradiator 320 in the second direction DR2. However, the upper end portions 511 and 521 are illustrated to be, for example, rectangular, as viewed in a plane.

The second covers 510 and 520 may include lower end portions 512 and 522 extending from lower ends of the upper end portions 511 and 521 and tilted in the first direction DR1. The lower end portions 512 and 522 of the second covers 510 and 520 may be formed such that the irradiation direction of the ultraviolet rays provided from the second ultraviolet irradiator 320 has an angle (e.g., a predetermined angle) with respect to the ink ejection direction IDR. As a result, the ultraviolet rays do not reach the ejected ink which is not applied on the substrate, so that curing thereof may not be performed. On the other hand, if the irradiation direction of the ultraviolet rays does not have an angle (e.g., a predetermined angle) with respect to the ink ejection direction IDR, the ultraviolet rays may reach the ejected ink which is not applied on the substrate, and there is a limitation that curing may be performed before the ejected ink is applied on the substrate.

In an embodiment, for example, the lower end portions 512 and 522 of the second covers 510 and 520 are tilted in the first direction DR1 with respect to the extending surfaces of the upper end portions 511 and 521 of the second covers 510 and 520, and the lower end portions 512 and 522 of the second covers 510 and 520 may have variable tilt angles with respect to the extending surfaces of the upper end portions 511 and 521 of the second covers 510 and 520. In the present specification, the extending surfaces of the upper end portions 511 and 521 of the second covers 510 and 520 mean virtual surfaces extending in the ink ejection direction IDR. The tilt angles of the lower end portions 512 and 522 of the second covers 510 and 520 may vary depending on the viscosity of the ink to be ejected, the light amount of the ultraviolet rays to be provided from the second ultraviolet irradiator 320, or the like.

In an embodiment, the tilt angles of the lower end portions 512 and 522 of the second covers 510 and 520 with respect to the extending surface of the upper end portions 511 and 521 of the second covers 510 and 520 may be 5 degrees to 80 degrees, and, in an embodiment, 10 degrees to 60 degrees, and, in an embodiment, 15 degrees to 45 degrees.

The tilt angles of the lower end portions 412 and 422 of the first covers 410 and 420 may be the same as or different from those of the lower end portions 512 and 522 of the second covers 510 and 520.

In an embodiment, the third ultraviolet irradiator 330 may be disposed or spaced apart by a distance (e.g., a predetermined distance) from a side surface of the stage 100 with respect to the first direction DR1. In this case, the third ultraviolet irradiator 330 may be disposed, but is not limited to, on a same line as the first ultraviolet irradiator 310 and the second ultraviolet irradiator 320. In an embodiment, the third ultraviolet irradiator 330 has an angle (e.g., a predetermined angle) θ with respect to a line parallel to the first direction DR1. The ink ejected on the substrate adjacent to the third ultraviolet irradiator 330 may be cured in a short time by the ultraviolet rays irradiated from the third ultraviolet irradiator 330.

Figure 2:
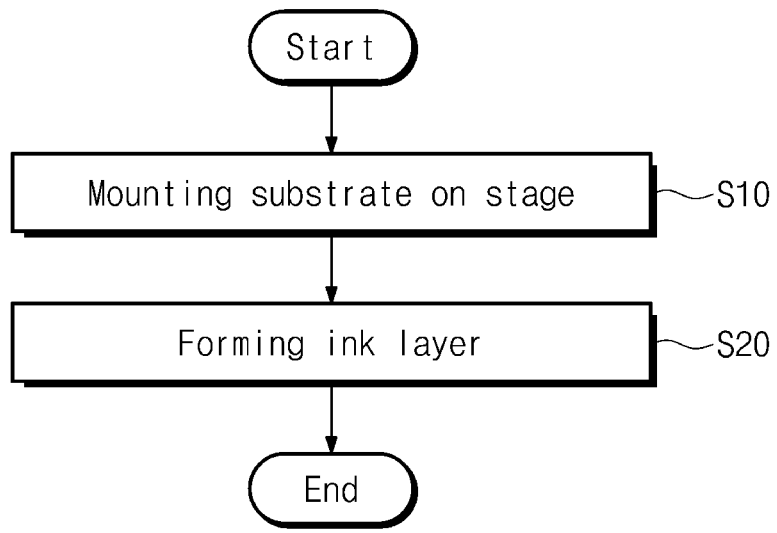
FIG. 2 is a flowchart schematically showing an inkjet printing method according to an embodiment of the inventive concept.
Figure 3:
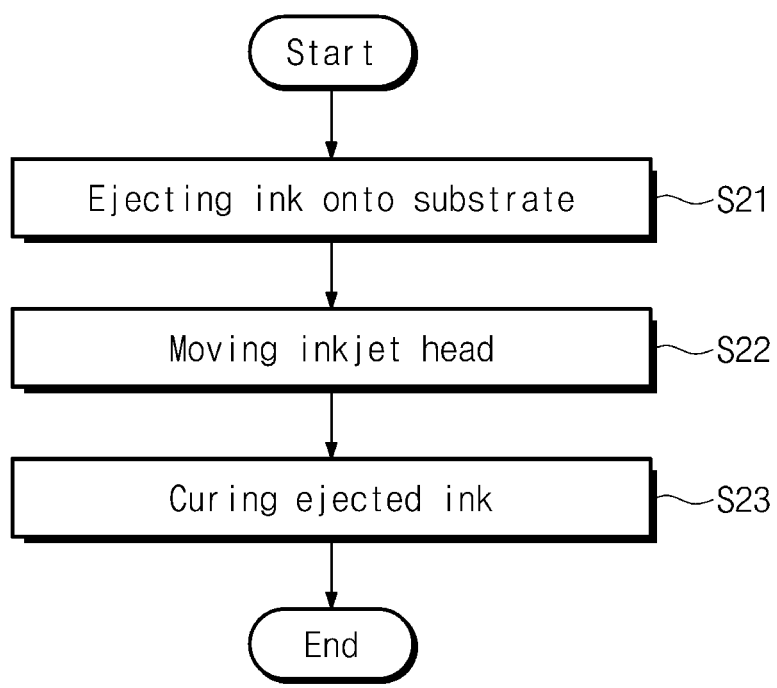
FIG. 3 is a flowchart schematically showing forming an ink layer illustrated in FIG. 2, according to an embodiment of the inventive concept.

Herein, an inkjet printing method according to an embodiment of the inventive concept will be described with reference to the drawings. FIG. 2 is a flowchart schematically showing an inkjet printing method according to an embodiment; and FIG. 3 is a flowchart schematically showing a step S20 of forming an ink layer illustrated FIG. 2, according to an embodiment. FIGS. 6 to 10 are cross-sectional views illustrating an inkjet printing method according to an embodiment.

The inkjet printing method according to an embodiment may include step S10 of mounting a substrate on a stage, and step S20 of forming an ink layer.

Figure 6:
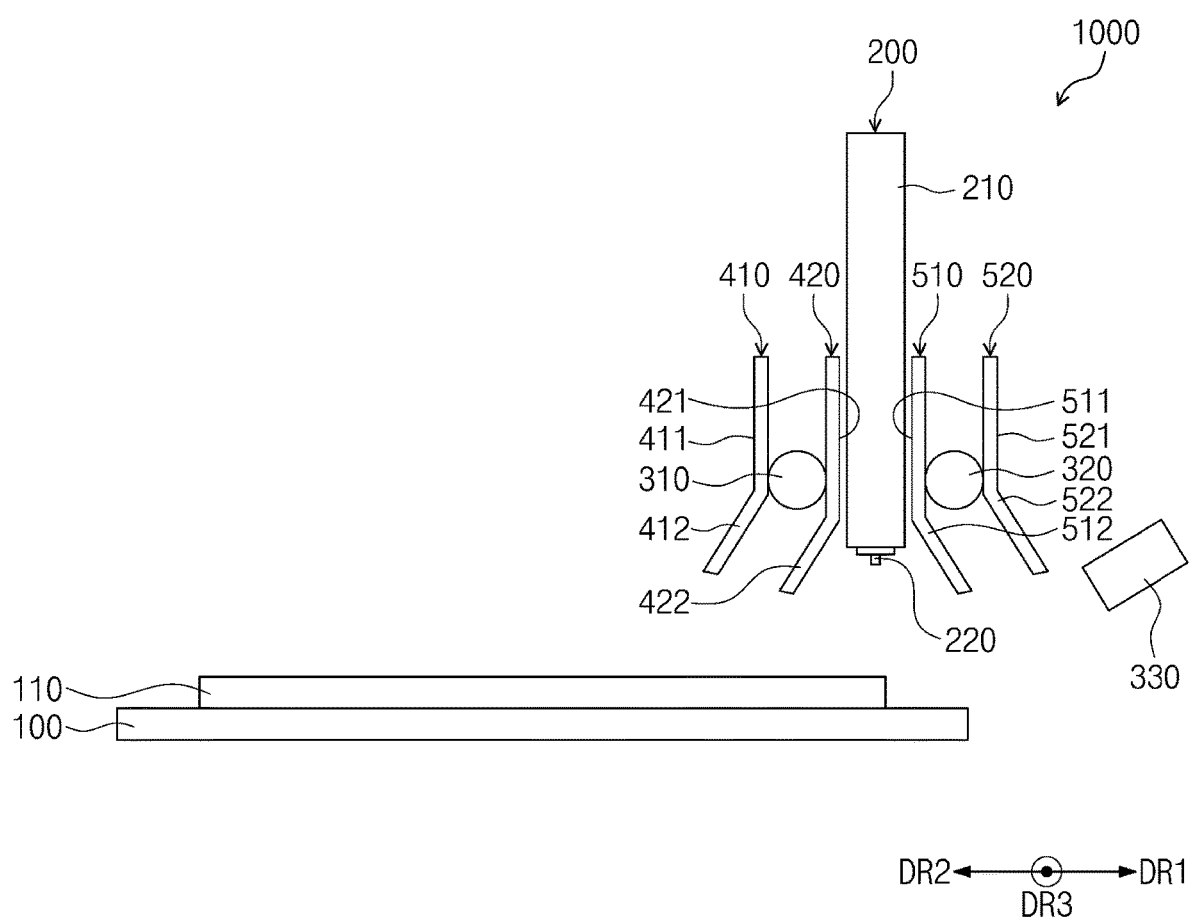
FIGS. 6 to 10 are cross-sectional views illustrating an inkjet printing method according to an embodiment.

FIG. 6 is a cross-sectional view illustrating step S10 of mounting a substrate 110 on a stage 100 illustrated in FIG. 2. Step S10 of mounting the substrate 110 on the stage 100 may be a step of preparing or providing the substrate 110 for forming an ink layer. In an embodiment, the provided substrate 110 may be used for manufacturing a display device. For example, the substrate 110 may be used for a portable display device, such as a smartphone, or a medium or large-sized display device, such as a TV, a notebook computer, or a monitor. The substrate 110 may have a plate shape including one surface, another surface opposite to the one surface, and a side surface configured to connect the one surface to the other surface. The shape and size of the substrate 110 as viewed in a plane are not limited, but the substrate 110 is illustrated to be, for example, rectangular, as viewed in a plane.

Step S20 of forming an ink layer may be a step of forming an ink layer on the substrate 110 in a desired shape by using the inkjet print apparatus 1000 according to the inventive concept. As illustrated in FIG. 3, step S20 of forming the ink layer may include, but is not limited to, step S21 of ejecting ink onto the substrate 100, step S22 of moving an inkjet head 200, and step S23 of curing the ejected ink.

In this case, although it is described as an example that the inkjet head 200 moves in the second direction DR2 in step S20 of forming the ink layer, the embodiment of the inventive concept is not limited thereto, and the inkjet head 200 may move in the first direction DR1.

Figure 7:
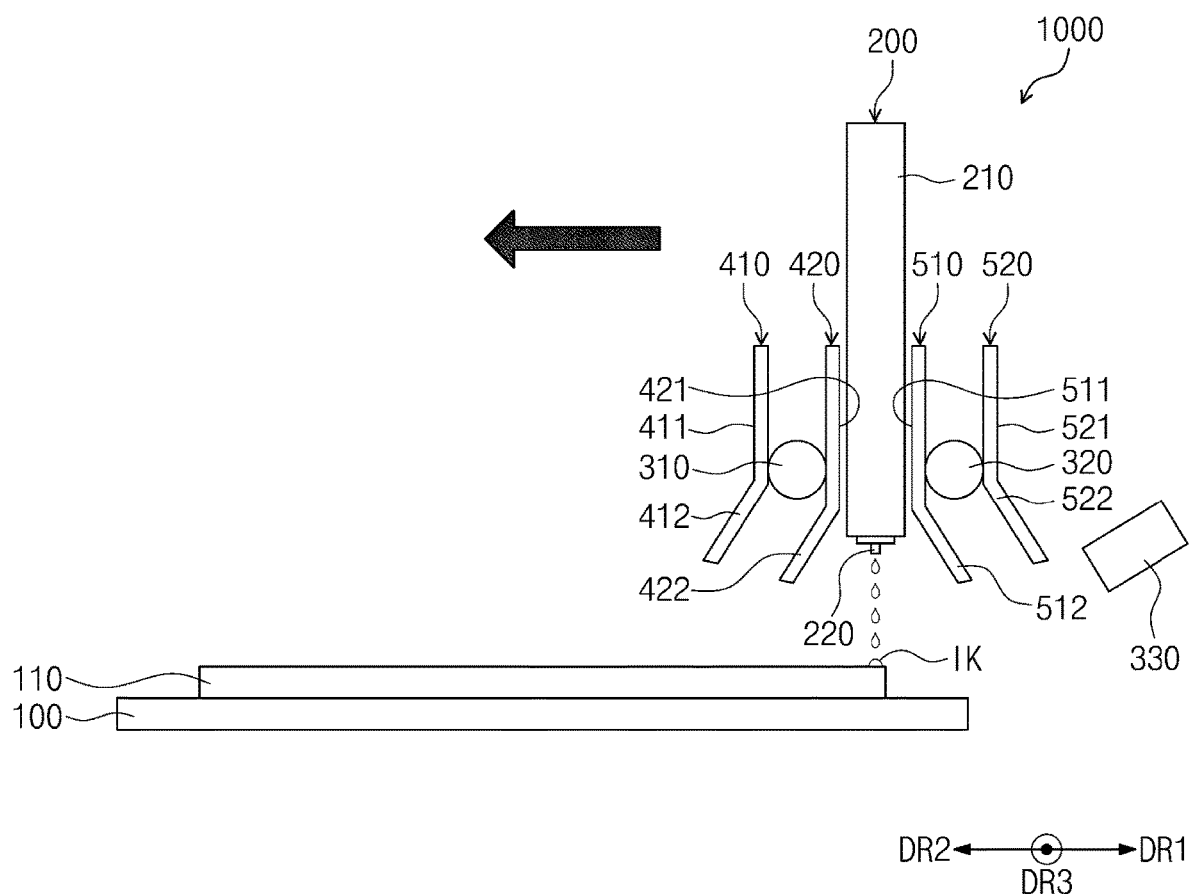

FIG. 7 is a cross-sectional view illustrating step S21 of ejecting an ink illustrated in FIG. 3 onto the substrate 110. The inkjet head 200 moves in the second direction DR2, and ink IK ejected from the nozzle 220 of the inkjet head 200 is applied on the substrate 110. In an embodiment, ink ejection of the nozzle 220 is controlled by a control unit (not illustrated), and the ink may be applied uniformly and precisely on the substrate 110 in a desired shape.

When the substrate 110 mounted on the stage 100 is used in a display device, in an embodiment, the ink is an optical clear resin or an optical clear adhesive. For example, the layer formed on the substrate 110 by curing the ejected ink may be a transparent adhesive layer.

The optical clear resin and the optical clear adhesive used as ink are not particularly limited, but, in an embodiment, the viscosity thereof is 8 cP to 20 cP. When the viscosity of the ink is in this range, the ink may be easily controlled by the inkjet print apparatus 1000. On the other hand, when the viscosity of the ink is less than 8 cP, it is difficult to control the ink in the process, and when the viscosity of the ink is more than 20 cP, it may be difficult to eject the ink through the nozzle 220 of the inkjet head 200.

In an embodiment, the optical clear resin and the optical clear adhesive are an acryl-based resin, but are not limited thereto. The acryl-based resin may be urethane acrylate, polyester acrylate, epoxy acrylate, silicon acrylate, acrylic acrylate, melamine acrylate, polymethyl methacrylate, or the like, and may be one kind or a mixture of two kinds or more thereof. However, embodiments are not limited thereto.

Figure 8:
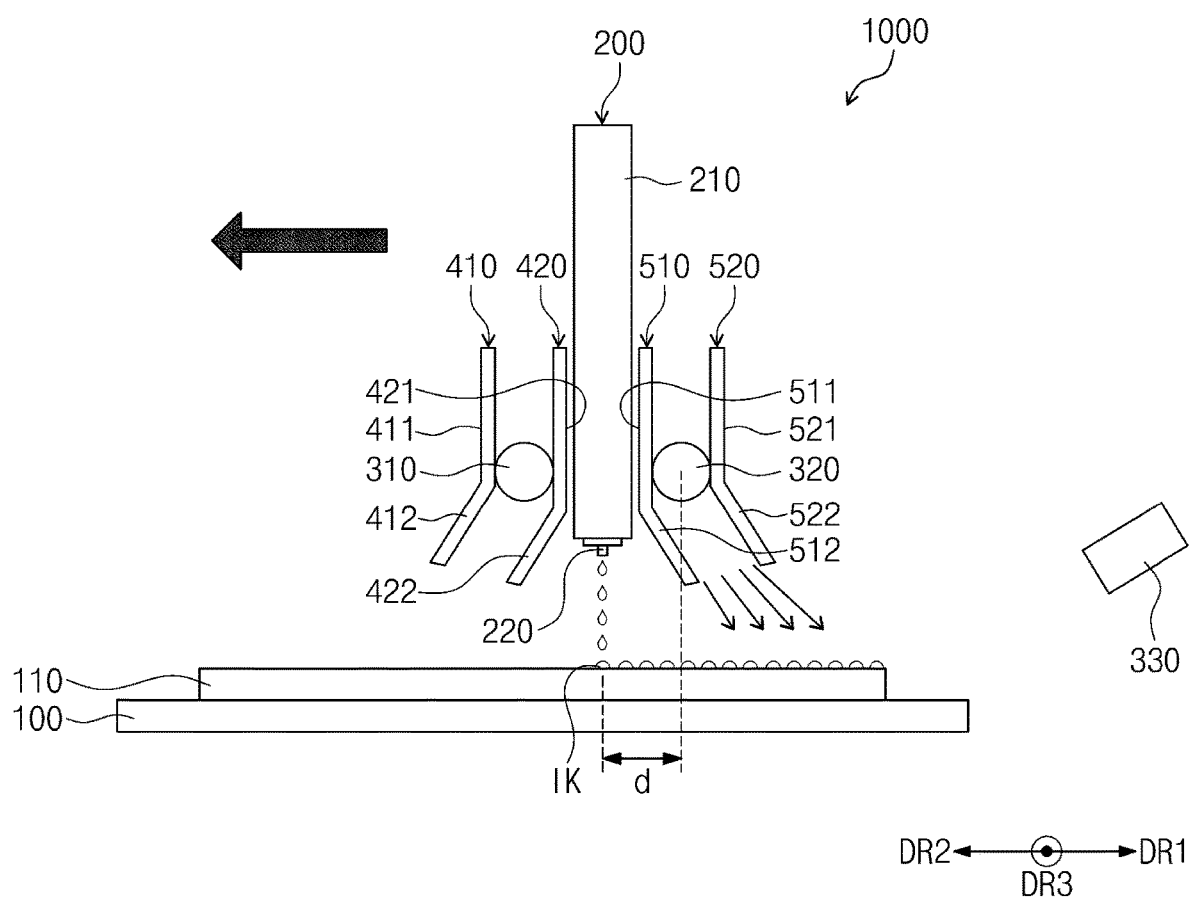

FIG. 8 is a cross-sectional view illustrating step S22 of moving an inkjet head 200 and step S23 of curing the ejected ink. As illustrated in FIG. 8, the inkjet head 200 moves in the second direction DR2, and the ink IK may be ejected and applied on the substrate 110 by the distance moved. The first ultraviolet irradiator 310 and the second ultraviolet irradiator 320 may move with the inkjet head 200 in the second direction DR2. In an embodiment, the ejected ink IK is cured through the ultraviolet rays to be irradiated from the second ultraviolet irradiator 320 disposed behind the inkjet head 200 with respect to the second direction DR2. The ink IK applied on the front surface of the substrate 110 is cured by ultraviolet rays, such that an adhesive layer AL1 (see FIG. 9) may be formed.

In an embodiment, the lower covers 512 and 522 of the second covers 510 and 520 disposed on both sides of the second ultraviolet irradiator 320 in the second direction DR2 may be formed such that the irradiation direction of the ultraviolet rays to be provided from the second ultraviolet irradiator 320 has an angle (e.g., a predetermined angle) with respect to the ink ejection direction. As a result, the ultraviolet rays do not reach the ejected ink which is not applied on the substrate 110, so that curing thereof may not be performed. On the other hand, if the irradiation direction of the ultraviolet rays does not have an angle (e.g., a predetermined angle) with respect to the ink ejection direction, the ultraviolet rays may reach the ejected ink which is not applied on the substrate 110, and there is a limitation that curing may be performed before the ejected ink is applied on the substrate 110.

The second ultraviolet irradiator 320 is disposed behind the inkjet head 200 with respect to the second direction DR2, such that a gap in the moving distance is created between the second ultraviolet irradiator 320 and the inkjet head 200. For example, the second ultraviolet irradiator 320 has to move at least a distance (e.g., a predetermined distance) "d" in the second direction DR2 in order to irradiate ultraviolet rays to the ink IK which is ejected from the inkjet head 200 and applied on the substrate 110. The ejected ink IK stands left during a time when the second ultraviolet irradiator 320 moves to the position of the applied ink IK, and a spreading phenomenon may occur in the applied ink during this time. In order to prevent or substantially prevent this phenomenon, in an embodiment, ultraviolet rays are irradiated from the third ultraviolet irradiator 330 adjacent to the applied ink IK, and thus the applied ink IK may be cured. Further, in an embodiment, the ink, which is applied on the substrate 110 adjacent to the third ultraviolet irradiator 330, is cured by the ultraviolet rays irradiated from the third ultraviolet irradiator 330

Figure 9:
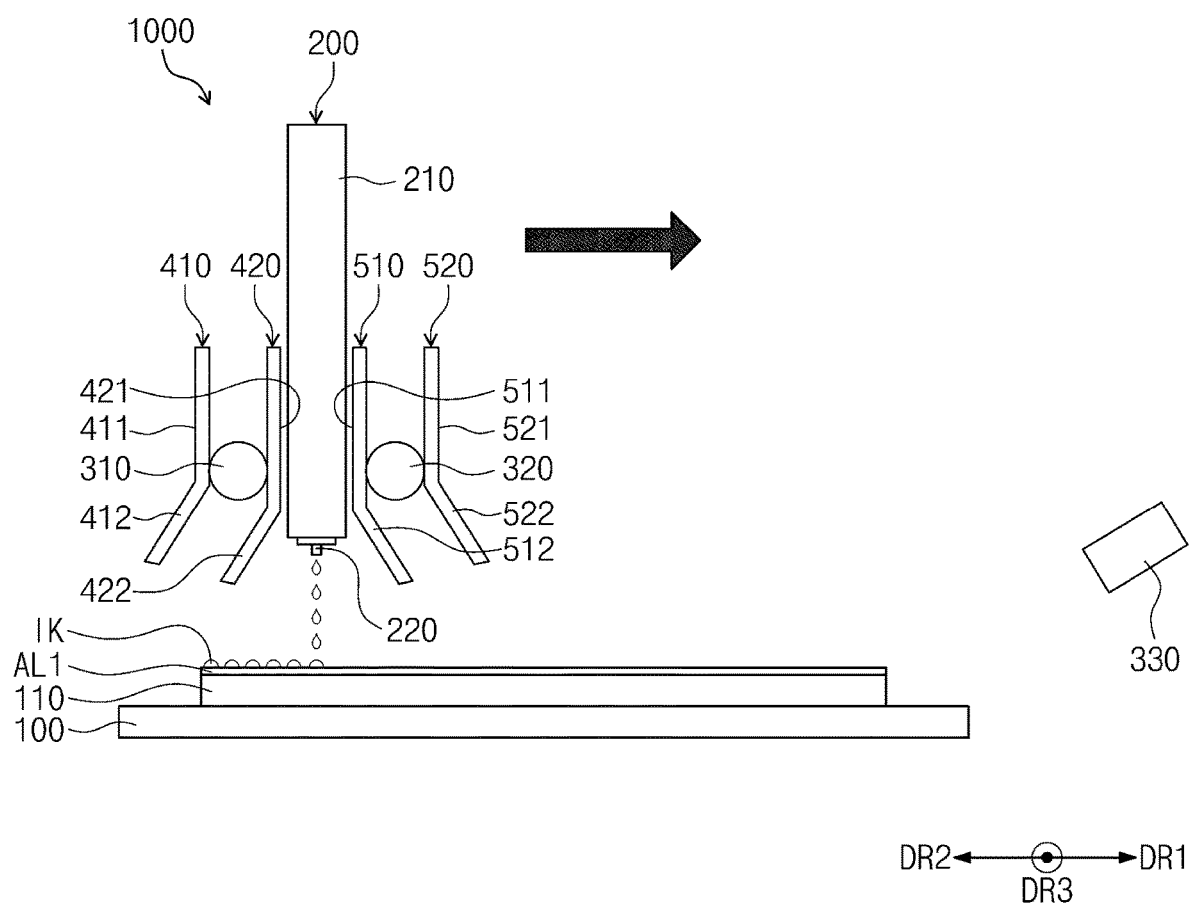

As illustrated in FIG. 9, step S20 of forming an ink layer may be repeated while moving the inkjet head 200 in the first direction DR1 which is an opposite direction to the second direction DR2 in which the inkjet head 200 moves in step S22 of moving the inkjet head 200. The step S20 of forming the ink layer may be repeated n times. In this case, n may be an integer of 1 or more. In an embodiment, n may be an integer of 2 or more. That is, the step S20 of forming the ink layer may be performed one time, or may be performed through two or more processes. In an embodiment, the direction in which the inkjet head 200 moves in the step of forming the (n−1)-th ink layer is opposite to the direction in which the inkjet head 200 moves in the step of forming the n-th ink layer.

Figure 10:
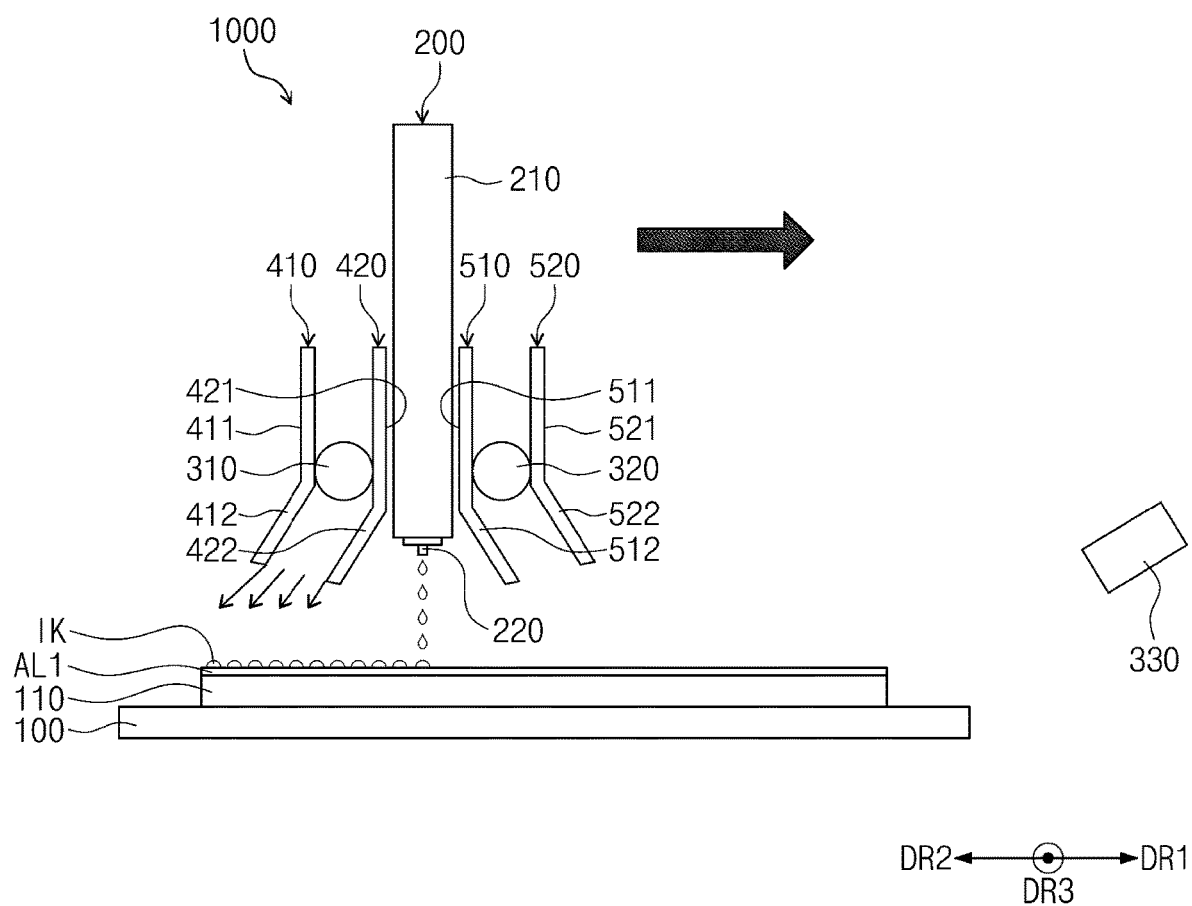

In an embodiment, as illustrated in FIG. 10, when the ink layer is formed while the inkjet head 200 moves in the first direction DR1, the ejected ink is cured by irradiating ultraviolet rays from the first ultraviolet irradiator 310 disposed behind the inkjet head 200. That is, the ultraviolet rays may be irradiated from an ultraviolet irradiator disposed behind the inkjet head 200 with respect to the moving direction of the inkjet head 200. The ink layer according to an embodiment may be an adhesive layer AL1.

In an embodiment, a light amount of ultraviolet rays to be irradiated in the step of forming the (n−1)-th ink layer is greater than a light amount of ultraviolet rays to be irradiated in the step of forming the n-th ink layer. In an embodiment, when the step of forming the ink layer is repeated n times, the light amount of ultraviolet rays irradiated at each step is decreased from the step of forming the first ink layer toward the step of forming the n-th ink layer. As described above, in the case of controlling the light amount of ultraviolet rays, a fluidity of the adhesive layer may be increased from the first adhesive layer toward the n-th adhesive layer. As a result, when an adhesive material is laminated on the substrate in which the ink layer has been formed, an excellent level difference absorbency may be realized due to the fluidity of the surface of the ink layer.

Figure 11:
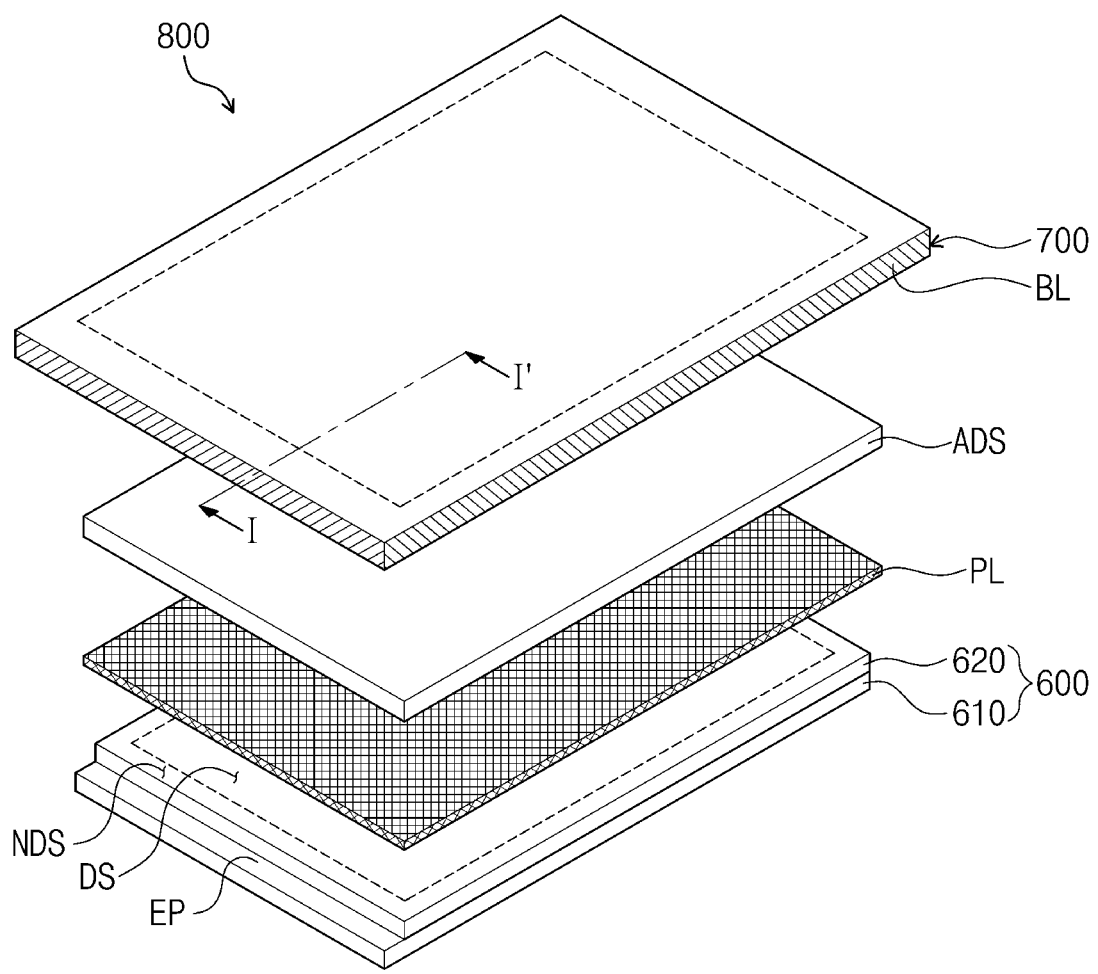
FIG. 11 is an exploded perspective view schematically illustrating a display device according to an embodiment of the inventive concept.
Figure 12:
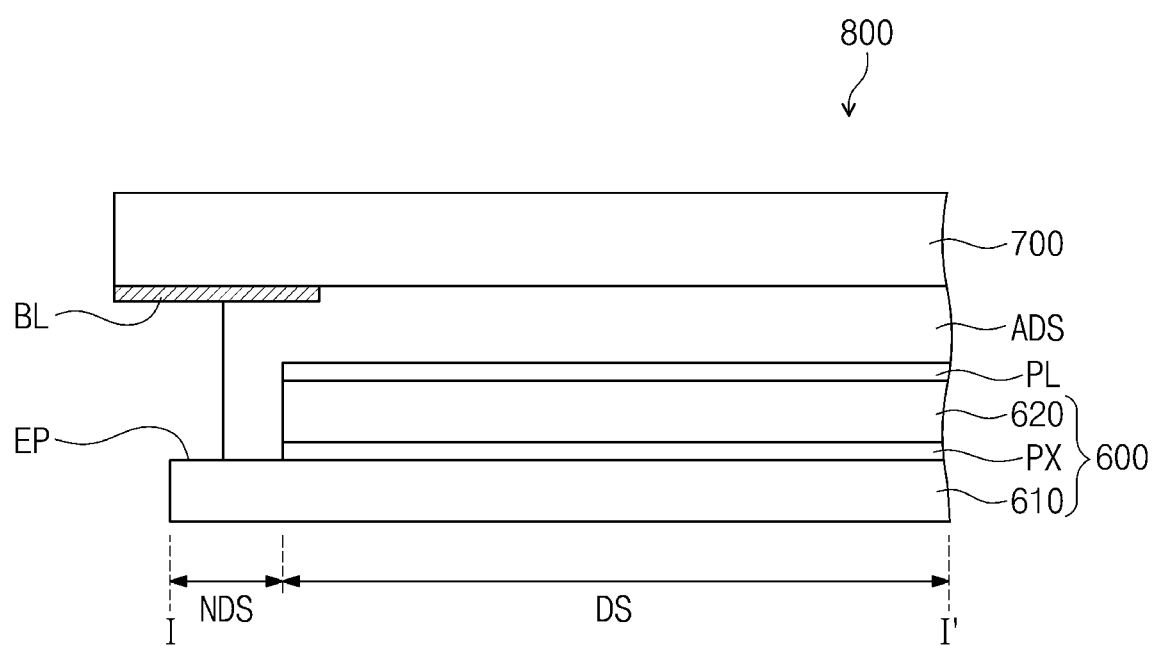
FIG. 12 is an enlarged cross-sectional view taken alone the line I-I' illustrated in FIG. 11.

FIG. 11 is an exploded perspective view of a display device according to an embodiment of the inventive concept; and FIG. 12 is a cross-sectional view taken along the line I-I' illustrated in FIG. 11.

Referring to FIGS. 11 and 12, a display device 800 is a device configured to display an image, and the display device 800 may be an organic light emitting display device, but is not limited thereto. For example, the display device 800 may be a liquid crystal display device.

The display device 800 includes a display panel 600, a polarization plate PL, a window 700, a light blocking layer BL, and an adhesive layer ADS.

The display panel 600 may have a display area DS and a non-display area NDS surrounding the display area DS, and the display panel 600 may display an image through the display area DS. In an embodiment, the display panel 600 may be an organic light emitting display panel, and the display panel 600 may include a display substrate 610, an encapsulation substrate 620, and a pixel layer PX.

In an embodiment, the display substrate 610 may be a glass substrate or a plastic substrate, and the pixel layer PX is disposed on the display substrate 610. A terminal portion EP is defined on a side of the display substrate 610, and a driving chip (not illustrated) may be mounted on the terminal portion EP.

The pixel layer PX may include a plurality of pixels. Each of the plurality of pixels PX may include an anode, a cathode, and an organic light emitting layer disposed between the anode and the cathode.

The encapsulation substrate 620 faces the display substrate 610, and may protect the pixel layer PX from external moisture by sealing the pixel layer PX.

The display panel 600 may have the above-described structure, but is not limited to the structure of the above-described display panel 600. For example, the encapsulation substrate 620 may be replaced with thin encapsulation layers, and the thin encapsulation layers may have a structure in which an organic layer and an inorganic layer are repeatedly stacked alternately.

The polarization plate PL may polarize the light emitted from the display panel 600. The polarization plate PL is attached to the display panel 600, and, in an embodiment, the polarization plate PL may be attached to the encapsulation substrate 620 and may be in contact with the adhesive layer ADS. The polarization plate PL may circularly polarize the light emitted from the display panel 600. The polarization plate PL may be an anti-reflection layer configured to block the light entering from the outside of the display panel 600.

The window 700 may cover the display panel 600 to protect the display panel 600 from an external impact. The window 700 may be a glass substrate or a plastic substrate having light transmittance.

The light blocking layer BL is disposed on the rear surface of the window 700 and overlaps the non-display area NDS. The light blocking layer BL may include a material which absorbs light, such as carbon black. Therefore, one area of the window 700 corresponding to the non-display layer NDS may be defined as a non-transmissive area by the light blocking layer BL. In an embodiment, the light blocking layer BL may be further disposed on the side surface as well as the rear surface of the window 700.

The adhesive layer ADS is interposed between the display panel 600 and the window 700 and attaches the window 700 to the display panel 600. In an embodiment, the adhesive layer ADS may have an elongated shape along four edges of the display panel 600 having a rectangular shape. In addition, the adhesive layer ADS may be provided on the front surface of the display panel 600.

In an embodiment, the adhesive layer ADS is disposed such that the display panel 600 and the polarization plate PL are completely covered, such that the display panel 600 and the window 700 may be physically bonded. The adhesive layer ADS may be an adhesive layer prepared by applying and curing a liquid-phased adhesive. By thinly applying the adhesive on the polarization plate PL at a uniform thickness, the overall thickness of the display device 800 may be minimized or reduced. In this case, when the adhesive is applied by using the inkjet print apparatus 1000 according to an embodiment of the inventive concept, the adhesive may be applied uniformly and precisely.

Figure 4:
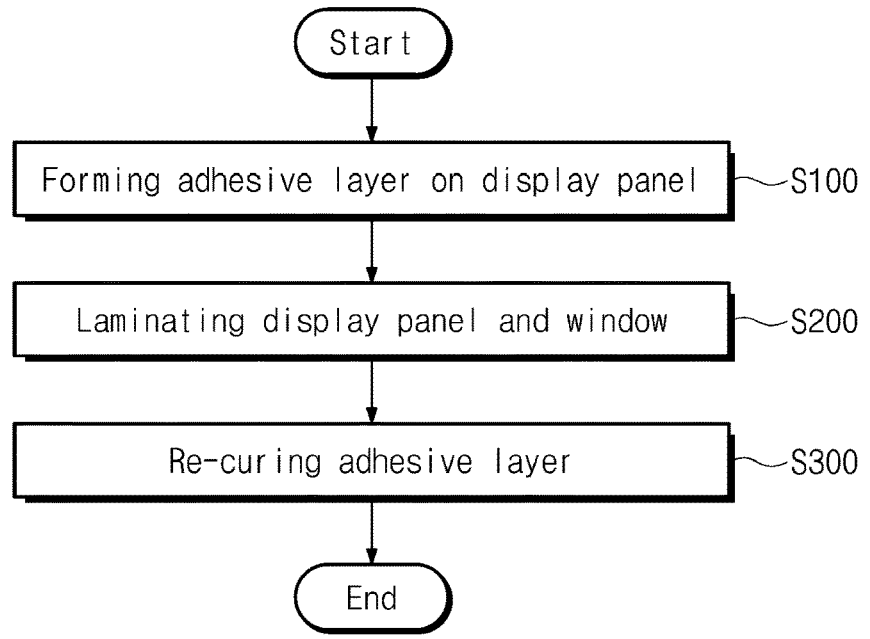
FIG. 4 is a flowchart schematically showing a lamination method according to an embodiment of the inventive concept.
Figure 5:
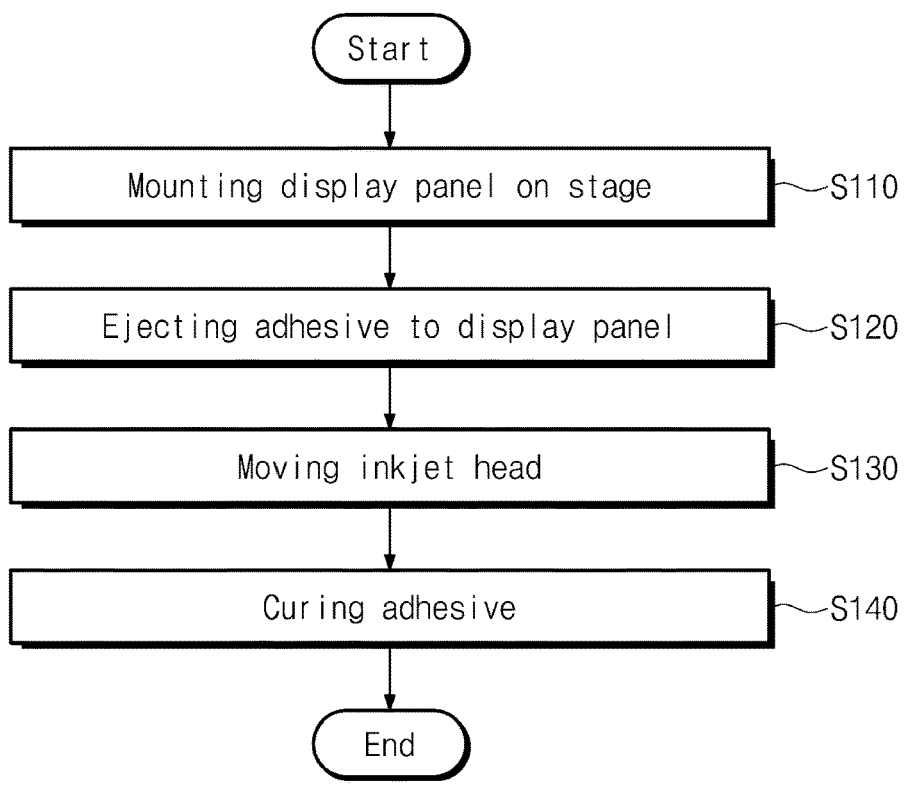
FIG. 5 is a flowchart schematically showing forming an adhesive layer on a display panel illustrated in FIG. 4, according to an embodiment of the inventive concept.

Herein, a lamination method according to an embodiment of the inventive concept will be described with reference to the drawings. FIG. 4 is a flowchart schematically showing a lamination method according to an embodiment of the inventive concept; and FIG. 5 is a flowchart schematically showing forming an adhesive layer on a display panel illustrated in FIG. 4, according to an embodiment of the inventive concept. The lamination method according to an embodiment may be a method for laminating a display panel 600 and a window 700 of the display device 800 illustrated in FIGS. 11 and 12.

The lamination method according to an embodiment may include step S100 of forming an adhesive layer on the display panel, step S200 of laminating the display panel and the window, and step S300 of re-curing the adhesive layer.

In this case, step S100 of forming the adhesive layer on the display panel may be a step of forming an adhesive layer on the display panel in a desired shape by using the inkjet print apparatus 1000 according to an embodiment of the inventive concept. In an embodiment, step S100 of forming the adhesive layer may include, but is not limited to, step S110 of mounting the display panel on a stage 100, step S120 of ejecting an adhesive onto the display panel, step S130 of moving an inkjet head 200, and step S140 of curing the adhesive.

In an embodiment, the lamination method of the inventive concept may include a process overlapping the above-described inkjet printing method, and thus a redundant description will not be provided herein.

Step S110 of mounting the display panel on the stage 100 may be the same as step S10 of mounting the substrate 110 on the stage 100 illustrated in FIG. 6, except for using the display panel 600 as a substrate 110. In this case, the display panel 600 may include a display substrate 610, an encapsulation substrate 620, and a pixel layer PX as illustrated in FIG. 12. In addition, a polarization plate PL may be formed on the display panel 600, but embodiments of the inventive concept are not limited thereto.

Step S120 of ejecting the adhesive to the display panel may include the same process as step S21 of ejecting the ink illustrated in FIG. 7 onto the substrate 110, except for using the adhesive as ink. Step S120 of ejecting the adhesive to the display panel may be a step of applying the adhesive onto the display panel from each nozzle 220 of the inkjet head 200. The adhesive may be applied uniformly and precisely on the display panel in a desired shape through each nozzle 220 of the inkjet head 200.

In an embodiment, the adhesive is preferably an optical clear resin or an optical clear adhesive. The optical clear resin and the optical clear adhesive are not particularly limited and, in an embodiment, may be an acryl-based resin having a viscosity of 8 cP to 20 cP.

Step S130 of moving the inkjet head 200 and step S140 of curing the adhesive may include the same process as step S22 of moving the inkjet head 200 and step S23 of curing the ejected ink. The inkjet head 200 moves in the second direction DR2, and the adhesive may be applied on the display panel by the distance moved. In an embodiment, the ejected ink is cured through the ultraviolet rays to be irradiated from the second ultraviolet irradiator 320 disposed behind the inkjet head 200 with respect to the second direction DR2.

In an embodiment, step S100 of forming the adhesive layer on the display panel may be repeated while moving the inkjet head 200 in the first direction DR1 which is an opposite direction to the second direction DR2 in which the inkjet head 200 moves in S130 of the moving the inkjet head 200. In an embodiment, step S100 of forming the adhesive may be repeated m times in order to form a desired thickness of the adhesive layer on the display panel. In this case, m may be an integer of 1 or more. In an embodiment, m may be an integer of 2 or more. In an embodiment, the direction in which the inkjet head 200 moves in the forming the (m−1)-th adhesive layer is opposite to the direction in which the inkjet head 200 moves in the forming the m-th adhesive layer.

In an embodiment, a light amount of ultraviolet rays to be irradiated in the step of forming the (m−1)-th adhesive layer is greater than the light amount of ultraviolet rays irradiated in the step of forming the m-th adhesive layer. In an embodiment, the light amount of ultraviolet rays to be irradiated in each step is decreased from the step of forming the first adhesive layer toward the step of forming the m—the adhesive layer. When the light amount of ultraviolet rays is controlled as described above, the fluidity of the adhesive layer may be increased from the first adhesive layer toward the m-th adhesive layer. As a result, when the display panel and the window in which the adhesive layer is formed are laminated, an excellent level difference absorbency may be realized due to the fluidity of the surface of the adhesive layer.

As illustrated in FIG. 12, the adhesive layer disposed in a portion of the non-display area NDS of the display panel may be formed thicker than the adhesive layer disposed in the display area DS. In an embodiment, the inkjet head 200 moves over a portion of the non-display area NDS repeatedly, such that step S100 of forming the adhesive layer may be repeated k times. In this case, k may be an integer of 1 or more, where k and m may be the same as or different from each other. For example, k may be an integer larger than m. In an embodiment, after the display panel is mounted on the stage 100 such that the non-display area NDS of the display panel is disposed adjacent to the third ultraviolet irradiator 330, the ink ejected on the non-display area NDS of the display panel is cured by ultraviolet rays to be irradiated from the third ultraviolet irradiator 330. As a result, the spreading phenomenon may be prevented or substantially prevented from being created in the ink resulting from a gap in the moving distance between the inkjet head 200 and the first and second ultraviolet irradiators 310 and 320.

Step S200 of laminating the display panel and the window may be a step of applying pressure after the window is disposed on the display panel in which the adhesive layer is formed. Step S300 of re-curing the adhesive layer may be a step of bonding the display panel and the window by irradiating ultraviolet rays on the adhesive layer formed between the display panel and the window, thereby re-curing the adhesive layer.

According to an embodiment of the inventive concept, by using an inkjet print apparatus in which an inkjet head and an ultraviolet irradiator are integrally formed, ink is applied and cured at the same time, such that the process may be simplified. Also, a desired pattern may be formed in a short time, and the ink may be applied uniformly and precisely in a desired pattern.

Although some exemplary embodiments of the present invention have been described, it is to be understood that the present invention should not be limited to these exemplary embodiments, but various changes and modifications can be made by one of ordinary skill in the art within the spirit and scope of the present invention as claimed.

Therefore, the technical scope of the present invention should not be limited to the contents described in the above description of the specification, but should be defined by the claims.

What is claimed is:

1. An inkjet print apparatus comprising:
   a stage;
   an inkjet head located over an upper portion of the stage, configured to move in a first direction and a second direction opposite to the first direction, and configured to eject an ink toward the stage;
   a first ultraviolet irradiator located behind the inkjet head with respect to the first direction;
   first covers located at respective sides of the first ultraviolet irradiator in the first and second directions;
   a second ultraviolet irradiator located behind the inkjet head with respect to the second direction; and
   second covers located at respective sides of the second ultraviolet irradiator in the first and second directions,
   wherein the first covers include first upper end portions configured to cover both sides of the first ultraviolet irradiator; and first lower end portions extending from lower ends of the first upper end portions, and tilted in the second direction, and
   wherein the second covers include second upper end portions configured to cover both sides of the second ultraviolet irradiator; and second lower end portions extending from lower ends of the second upper end portions, and tilted in the first direction.

2. The inkjet print apparatus of claim 1, further comprising a third ultraviolet irradiator spaced apart by a distance from a side surface of the stage with respect to the first direction.

3. The inkjet print apparatus of claim 2, wherein the third ultraviolet irradiator has an angle with respect to a line parallel to the first direction.

4. The inkjet print apparatus of claim 2, wherein the inkjet head is configured to move repeatedly from the side surface of the stage adjacent to the third ultraviolet irradiator by a distance.

5. The inkjet print apparatus of claim 1, wherein irradiation directions of ultraviolet rays from the first ultraviolet irradiator and the second ultraviolet irradiator have angles with respect to an ejection direction of the ink.

6. The inkjet print apparatus of claim 1, wherein the first ultraviolet irradiator located behind the inkjet head with respect to the first direction is configured to irradiate ultraviolet rays after the ink is ejected from the inkjet head.

7. The inkjet print apparatus of claim 1, wherein the inkjet head comprises a plurality of nozzles arranged in at least one row along a direction crossing the first direction and an ejection direction of the ink.

8. The inkjet print apparatus of claim 1, wherein the first ultraviolet irradiator and the second ultraviolet irradiator comprise a plurality of light sources spaced apart from each other in a direction crossing the first direction and an ejection direction of the ink.

9. The apparatus of claim 1, wherein the first direction and the second direction are perpendicular to an ejection direction of the ink.

* * * * *